United States Patent [19]
Tsuzuki et al.

[11] Patent Number: 5,815,564
[45] Date of Patent: Sep. 29, 1998

[54] SYSTEM FOR CONNECTING AN INCOMING CALL TO A SELECTED ONE OF A NUMBER OF EXTENSIONS

[75] Inventors: Takuo Tsuzuki, Hiratsuka; Masahiro Kumon, Yokohama; Yoshiharu Kondoh, Yokohama; Mitsuhiro Kotake, Yokohama; Masayuki Hashimura, Yokohama, all of Japan

[73] Assignees: Hitachi, Ltd., Tokyo; Hitachi Software Engineering Co., Ltd.; Hitachi Communication Systems, Inc., both of Kanagawa-Ken, all of Japan

[21] Appl. No.: 684,216

[22] Filed: Jul. 19, 1996

Related U.S. Application Data

[63] Continuation of Ser. No. 559,459, Nov. 15, 1995, Pat. No. 5,563,940, which is a continuation of Ser. No. 74,482, Jun. 11, 1993, Pat. No. 5,541,992.

[30]     Foreign Application Priority Data

Jun. 11, 1992  [JP]  Japan ................................. 4-152428

[51] Int. Cl.$^6$ .................................................... H04M 3/00
[52] U.S. Cl. .......................................... 379/233; 379/210
[58] Field of Search ..................................... 379/201, 210, 379/211, 212, 233, 265, 266, 157, 165, 242, 243, 244, 245, 247, 269

[56]         References Cited

U.S. PATENT DOCUMENTS

| | | | |
|---|---|---|---|
| 3,740,485 | 6/1973 | Nickerson | 379/233 |
| 4,313,035 | 1/1982 | Jordan et al. | 379/211 |
| 4,451,705 | 5/1984 | Burke et al. | 379/211 |
| 4,611,094 | 9/1986 | Asmuth et al. | 379/201 |
| 4,680,785 | 7/1987 | Akiyama et al. | 379/216 |
| 4,752,876 | 6/1988 | Couch et al. | 364/407 |
| 4,956,861 | 9/1990 | Kondo | 379/211 |
| 5,027,384 | 6/1991 | Morganstein | 379/211 |
| 5,036,535 | 7/1991 | Gechter et al. | 379/210 |
| 5,197,096 | 3/1993 | Sakuma et al. | 379/211 |
| 5,233,648 | 8/1993 | Nakamura | 379/210 |
| 5,268,958 | 12/1993 | Nakano | 379/211 |
| 5,291,549 | 3/1994 | Izumi | 379/233 |
| 5,369,696 | 11/1994 | Krauss et al. | 379/269 |
| 5,392,346 | 2/1995 | Hassler et al. | 379/207 |
| 5,416,833 | 5/1995 | Harper et al. | 379/201 |
| 5,425,081 | 6/1995 | Gordon et al. | 379/100 |

FOREIGN PATENT DOCUMENTS

| | | |
|---|---|---|
| 5923666 | 2/1984 | Japan ................................. 379/192 |
| 62145995 | 6/1987 | Japan . |
| 63-177692 | 7/1988 | Japan . |
| 1243798 | 9/1989 | Japan . |
| 393388 | 4/1991 | Japan . |
| 3128593 | 5/1991 | Japan . |
| 3268695 | 11/1991 | Japan . |

OTHER PUBLICATIONS

SR 1000 PBX Product Reference Guide, 1987, pp. 12,34.
"Merlin Legend Communication System, Release 2.0 System Programming," AT&T 555–620–111, Issue 1, pp. 3–246–251, Oct. 1992.

Primary Examiner—Daniel S. Hunter
Attorney, Agent, or Firm—Antonelli, Terry, Stout & Kraus, LLP

[57]        ABSTRACT

In an incoming call service by which an extension can be directly called when a call comes in from another office, a dedicated terminal for selecting an extension to which the incoming call is connected is installed to enable the user to select it as desired, thereby increasing usage of call incoming lines for effective use. An exchange which connects an incoming call from another office directly to an extension, an input device for accepting specification of an extension corresponding to a specific incoming call, and a controller which includes a definition device for defining the correspondence between the specific incoming call and extension are provided. Upon receipt of an incoming call, the exchange connects the call to its corresponding extension in response to the correspondence defined in the definition device.

3 Claims, 23 Drawing Sheets

F I G. 4
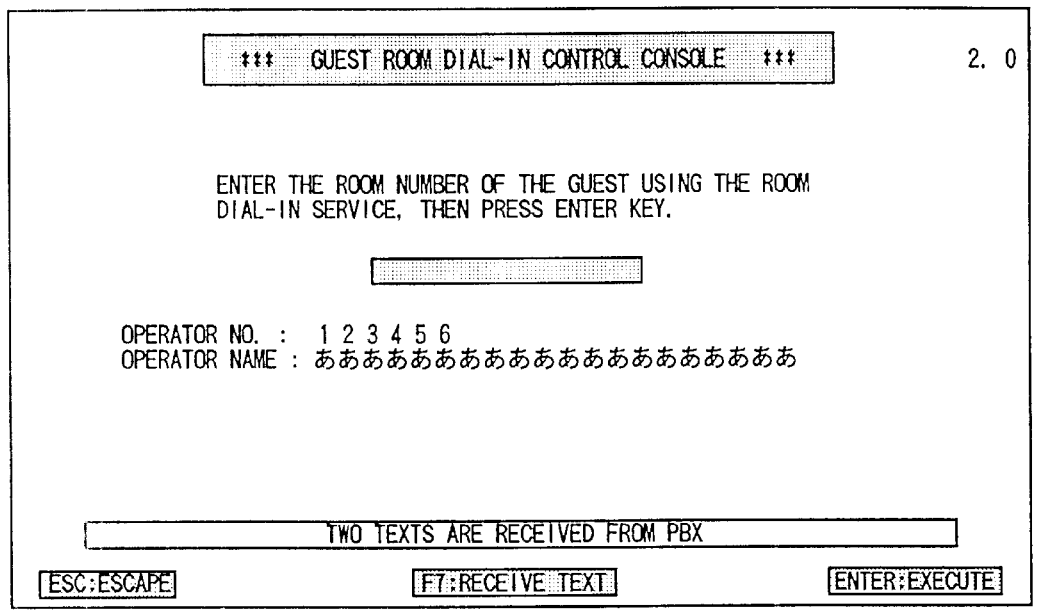

FIG. 5

```
***  GUEST ROOM DIAL-IN CONTROL CONSOLE  ***                    3.0

SELECT DIAL-IN NO. REGISTRATION METHOD AND
      PRESS ENTER KEY.

AUTOMATIC REGISTRATION          ARBITRARY REGISTRATION

OPERATOR NO.   : 1 2 3 4 5 6
OPERATOR NAME : ああああああああああああああああああ

GUEST NAME :   アアアアアアアアアアアアアアアアア
ROOM NO.   :   1 2 3 4 5 (A A A A)

ESC:ESCAPE      ←→:SCROLL                          ENTER:EXECUTE
```

FIG. 6

```
***  GUEST ROOM DIAL-IN CONTROL CONSOLE  ***                3.1

SPECIFY DIAL-IN NO. WITH SCROLL KEYS, THEN PRESS
        ENTER KEY.
  ROOM NO.   : 1 2 3 4 5    GUEST NAME: アアアアアアアアアアアアアアアアア
  DIAL-IN NO.: 0 4 5 - 8 8 1 - X X X X
XXXX
  1 1 1 1    1 1 1 2    1 1 1 3    1 1 1 4    1 1 1 5    1 1 1 6    1 1 1 7    1 1 1 8
  1 1 1 9    1 1 2 0    1 1 2 1    1 1 2 3    1 1 2 4    1 1 2 5    1 1 2 6    1 1 2 7
  1 1 2 8    1 1 2 9    1 1 3 0    1 1 3 1    1 1 3 2    1 1 3 3    1 1 3 4    1 1 3 5
  1 1 3 6    1 1 3 7    1 1 3 8    1 1 3 9    1 1 4 0    1 1 4 2    1 1 4 3    1 1 4 4
  1 1 4 5    1 1 4 6    1 1 4 7    1 1 4 8    1 1 4 9    1 1 5 0    1 1 5 1    1 1 5 2
  1 1 5 3    1 1 5 4    1 1 5 5    1 1 5 6    1 1 5 7    1 1 5 8    1 1 5 9    1 1 6 0
  1 1 6 1    1 1 6 2    1 1 6 3    1 1 6 4    1 1 6 5    1 1 6 6    1 1 6 7    1 1 6 8
  1 1 6 9    1 1 7 0    1 1 7 1    1 1 7 2    1 1 7 3    1 1 7 4    1 1 7 5    1 1 7 6

[ESC:ESCAPE]   [→←:SCROLL]   [PAGE UP]   [PAGE DOWN]   [ENTER:EXECUTE]
```

FIG. 7

```
***  GUEST ROOM DIAL-IN CONTROL CONSOLE  ***          3.2

TO IMMEDIATELY USE ROOM DIAL-IN SERVICE, PRESS ENTER
      KEY; OTHERWISE, ENTER TIME, THEN PRESS ENTER KEY.
      START TIME :  1 9 9 2 , 1 2 , 0 8   1 2 : 0 0
      END   TIME :  1 9 9 2 , 1 2 , 0 9   1 0 : 0 0
  OPERATOR NO.   : 1 2 3 4 5 6
  OPERATOR NAME  : あああああああああああああああああ

GUEST NAME     : アアアアアアアアアアアアアアアアア
  ROOM NO.       : 1 2 3 4 5  (A A A A)

DIAL-IN NO.    : 0 4 5 - 8 8 1 - 1 1 1 2

MESSAGE DESTINATION :  0 3 - 3 7 9 1 - 1 1 1 1
  FAX NO.

[ESC:ESCAPE]                                    [ENTER:EXECUTE]
```

FIG. 8

```
***   GUEST ROOM DIAL-IN CONTROL CONSOLE   ***          5.0

SPECIFY WHETHER OR NOT DIRECT IN PHONE NO. RESERVE
    CARD IS PRINTED OUT, THEN PRESS ENTER KEY.

OUTPUT              NO OUTPUT

OPERATOR NO.  :  1 2 3 4 5 6
OPERATOR NAME :  ああああああああああああああああああ

GUEST NAME :  アアアアアアアアアアアアアアアアア
ROOM NO.   :  1 2 3 4 5  (A A A A)

DIAL-IN NO. :  0 4 5 − 8 8 1 − 1 1 1 2

RESERVATION START TIME :  1 9 9 2, 1 2, 0 8   1 2 : 0 0   TO
            END TIME :    1 9 9 2, 1 2, 0 9   1 0 : 0 0

→←:SCROLL                                    ENTER:EXECUTE
```

FIG. 9

```
***  GUEST ROOM DIAL-IN CONTROL CONSOLE  ***            4.0

TO CHANGE DATA FOR THE ROOM IN DIAL-IN SERVICE,
   PRESS THE CORRESPONDING FUNCTION KEY.

OPERATOR NO.  : 1 2 3 4 5 6
OPERATOR NAME : ああああああああああああああああああ

GUEST NAME : アアアアアアアアアアアアアアアアア
ROOM NO.   : 1 2 3 4 5 (A A A A)

DIAL-IN NO. : 0 4 5 - 8 8 1 - 1 2 2 1

RESERVATION START TIME : 1 9 9 2, 1 2, 0 8  1 2 : 0 0  TO
            END TIME   : 1 9 9 2, 1 2, 0 9  1 0 : 0 0

[ESC:ESCAPE]  [F2:CANCEL TIME]  [F3:ROOM NO.]  [F8:CARD OUTPUT]
```

F I G. 10

```
***  GUEST ROOM DIAL-IN CONTROL CONSOLE  ***                    4.1

ENTER NEW RESERVATION END TIME, THEN PRESS THE
        ENTER KEY.
   RESERVATION END TIME : 1 9 9 2. 1 2. 1 0   1 0 : 0 0

OPERATOR NO.  : 1 2 3 4 5 6
   OPERATOR NAME : ああああああああああああああああああ

GUEST NAME :   ｱｱｱｱｱｱｱｱｱｱｱｱｱｱｱｱｱｱ
   ROOM NO.   :   1 2 3 4 5  (A A A A)

DIAL-IN NO. :  0 4 5 − 8 8 1 − 1 1 1 2

RESERVATION START TIME : 1 9 9 2. 1 2. 0 8  1 2 : 0 0  TO
               END TIME :   1 9 9 2. 1 2. 0 9  1 0 : 0 0

[ESC:ESCAPE]                                     [ENTER:EXECUTE]
```

F I G. 11

| *** GUEST ROOM DIAL-IN CONTROL CONSOLE *** | 4. 2 |

ENTER A NEW ROOM NUMBER. THEN PRESS THE ENTER KEY.

ROOM NO. :  1 2 3 4 5

OPERATOR NO. :  1 2 3 4 5 6
OPERATOR NAME :  ああああああああああああああああ

GUEST NAME :  アアアアアアアアアアアアアアアア
ROOM NO. :  1 2 3 4 5 （A A A A）

DIAL-IN NO. :  0 4 5 - 8 8 1 - 1 2 2 1

RESERVATION START TIME :  1 9 9 2, 1 2, 0 8    1 2 : 0 0   TO
　　　　　 END TIME :  1 9 9 2, 1 2, 0 9    1 0 : 0 0

ESC:ESCAPE                                              ENTER:EXECUTE

FIG. 12

```
***  GUEST ROOM DIAL-IN CONTROL CONSOLE  ***                6.0

TO CHANGE DATA FOR ROOM DIAL-IN SERVICE
    RESERVATION, PRESS THE CORRESPONDING FUNCTION KEY.

OPERATOR NO.  :  1 2 3 4 5 6
    OPERATOR NAME :  ああああああああああああああああああ

GUEST NAME    :  アアアアアアアアアアアアアアアアアア
    ROOM NO.      :  1 2 3 4 5  (A A A A)

DIAL-IN NO.   :  0 4 5 - 8 8 1 - 1 1 1 2

RESERVATION START TIME :  1 9 9 2, 1 2, 0 8   1 2 : 0 0   TO
                END TIME   :  1 9 9 2, 1 2, 0 9   1 0 : 0 0

[ESC:ESCAPE] [F3:ROOM NO.] [F4:DIAL-IN NO.] [F5:RESERVATION TIME] [F9:CARD OUTPUT]
```

FIG. 13

```
***  GUEST ROOM DIAL-IN CONTROL CONSOLE  ***          6. 1

ENTER A NEW ROOM NUMBER, THEN PRESS THE ENTER KEY.
    ROOM NO. :  [1 2 3 4 5]

OPERATOR NO. :  1 2 3 4 5 6
OPERATOR NAME : ああああああああああああああああああ

GUEST NAME :    アアアアアアアアアアアアアアアアアア
ROOM NO. :      1 2 3 4 5 (A A A A)

DIAL-IN NO. :   0 4 5 - 8 8 1 - 1 2 2 1

RESERVATION START TIME :  1 9 9 2, 1 2, 0 8   1 2 : 0 0  TO
            END TIME :    1 9 9 2, 1 2, 0 9   1 0 : 0 0

[ESC:ESCAPE]                                    [ENTER:EXECUTE]
```

FIG. 14

```
***   GUEST ROOM DIAL-IN CONTROL CONSOLE   ***                    6.3

ENTER NEW RESERVATION TIME, THEN PRESS THE
         ENTER KEY

RESERVATION START TIME :  1 9 9 2,  1 2,  0 8   1 5 : 0 0
            END TIME :    1 9 9 2,  1 2,  0 9   0 9 : 0 0

OPERATOR NO.   :  1 2 3 4 5 6
OPERATOR NAME  :  ああああああああああああああああああ

GUEST NAME :    アアアアアアアアアアアアアアアアアア
ROOM NO.   :    1 2 3 4 5  (A A A A)

DIAL-IN NO. :   0 4 5 - 8 8 1 - 1 1 1 2

RESERVATION START TIME :  1 9 9 2,  1 2,  0 8   1 2 : 0 0   TO
            END TIME :    1 9 9 2,  1 2,  0 9   1 0 : 0 0

ESC:ESCAPE                                           ENTER:EXECUTE
```

FIG. 15

```
┌──────────────────────────────────────────────────────────────────┐
│         ≠≠≠   GUEST ROOM DIAL-IN CONTROL CONSOLE   ≠≠≠      6. 2 │
│                                                                  │
│                                                                  │
│        SELECT DIAL-IN NO. REGISTRATION METHOD AND                │
│        PRESS ENTER KEY.                                          │
│                                                                  │
│            AUTOMATIC SELECTION    ARBITRARY SELECTION            │
│                                                                  │
│     OPERATOR NO.  : 1 2 3 4 5 6                                  │
│     OPERATOR NAME : ああああああああああああああああああ          │
│                                                                  │
│     GUEST NAME : アアアアアアアアアアアアアアアアアア             │
│     ROOM NO.   : 1 2 3 4 5  (A A A A)                            │
│                                                                  │
│     DIAL-IN NO. : 0 4 5 - 8 8 1 - 1 1 1 2                        │
│                                                                  │
│     RESERVATION START TIME : 1 9 9 2, 1 2, 0 8  1 2 : 0 0  TO    │
│                 END TIME :   1 9 9 2, 1 2, 0 9  1 0 : 0 0        │
│                                                                  │
│  [ESC:ESCAPE]  [→←:SCROLL]                        [ENTER:EXECUTE]│
└──────────────────────────────────────────────────────────────────┘
```

FIG. 16

```
***  GUEST ROOM DIAL-IN CONTROL CONSOLE  ***        6. 2. 1

SPECIFY DIAL-IN NO. WITH SCROLL KEYS, THEN PRESS
        ENTER KEY.
  ROOM NO.   : 1 2 3 4 5    GUEST NAME: ７７７７７７７７７７７７７７７７７
  DIAL-IN NO. : 0 4 5 - 8 8 1 - X X X X

X X X X
  1 1 1 1    1 1 1 2    1 1 1 3    1 1 1 4    1 1 1 5    1 1 1 6    1 1 1 7    1 1 1 8
  1 1 1 9    1 1 2 0    1 1 2 1    1 1 2 3    1 1 2 4    1 1 2 5    1 1 2 6    1 1 2 7
  1 1 2 8    1 1 2 9    1 1 3 0    1 1 3 1    1 1 3 2    1 1 3 3    1 1 3 4    1 1 3 5
  1 1 3 6    1 1 3 7    1 1 3 8    1 1 3 9    1 1 4 0    1 1 4 2    1 1 4 3    1 1 4 4
  1 1 4 5    1 1 4 6    1 1 4 7    1 1 4 8    1 1 4 9    1 1 5 0    1 1 5 1    1 1 5 2
  1 1 5 3    1 1 5 4    1 1 5 5    1 1 5 6    1 1 5 7    1 1 5 8    1 1 5 9    1 1 6 0
  1 1 6 1    1 1 6 2    1 1 6 3    1 1 6 4    1 1 6 5    1 1 6 6    1 1 6 7    1 1 6 8
  1 1 6 9    1 1 7 0    1 1 7 1    1 1 7 2    1 1 7 3    1 1 7 4    1 1 7 5    1 1 7 6

[ESC:ESCAPE]  [→←:SCROLL]   [PAGE UP]   [PAGE DOWN]   [ENTER:EXECUTE]
```

FIG. 17

```
***  GUEST ROOM DIAL-IN CONTROL CONSOLE  ***          7.0

A ROOM STATUS CHANGE HAS BEEN REPORTED FOR THE
       FOLLOWING GUEST ROOM.
       PRESS THE CORRESPONDING FUNCTION KEY.

OPERATOR NO.  : 1 2 3 4 5 6
  OPERATOR NAME : ああああああああああああああああああ

GUEST NAME :
  ROOM NO.   :    1 2 3 4 5

DIAL-IN NO. :   0 4 5 - 8 8 1 - 1 1 1 2

RESERVATION START TIME :  1 9 9 2, 1 2, 0 8   1 2 : 0 0   TO
              END TIME :    1 9 9 2, 1 2, 0 9   1 0 : 0 0

ESC:ESCAPE   F2:CANCEL
```

FIG. 18

```
***   GUEST ROOM DIAL-IN CONTROL CONSOLE   ***                8.0

A ROOM CHANGE HAS BEEN REPORTED FOR THE
        FOLLOWING GUEST ROOM.
        PRESS THE CORRESPONDING FUNCTION KEY.

OPERATOR NO.   : 1 2 3 4 5 6
OPERATOR NAME  : ああああああああああああああああ

GUEST NAME   :
OLD ROOM NO. :   1 2 3 4 5   ⇨   NEW ROOM NO. :   5 4 3 2 1

DIAL-IN NO.  :   0 4 5 - 8 8 1 - 1 1 1 2

RESERVATION START TIME :   1 9 9 2, 1 2, 0 8   1 2 : 0 0   TO
            END TIME   :   1 9 9 2, 1 2, 0 9   1 0 : 0 0

[ESC:ESCAPE]  [F1:REREGISTER]  [F2:CANCEL]
```

*   DIRECT IN PHONE NO. INFORM CARD   *

GUEST NAME    _____

ROOM NO.      _____

PHONE NO.     _____

HOTEL NAME, ETC.
```

*   DIRECT IN PHONE NO. RESERVE CARD   *

GUEST NAME    _____

ROOM NO.      _____

PHONE NO.     _____

RESERVE INF.
         FROM '91.XX.XX  XX:XX     TO '91.XX.XX  XX:XX
                                     HOTEL NAME, ETC.
```

SYSTEM FOR CONNECTING AN INCOMING CALL TO A SELECTED ONE OF A NUMBER OF EXTENSIONS

This application is a Continuation of application Ser. No. 08/559,459 filed Nov. 15,1995, now U.S. Pat. No. 5,562,940, which is a Continuation application of Ser. No. 08/074,482, filed Jun. 11, 1993, U.S. Pat. No. 5,541,992.

BACKGROUND OF THE INVENTION

1. Field of the Invention

This invention relates to a system for connecting an incoming call to a selected one of a number of destinations and more particularly to a system which enables any person other than those who undergo specific training for changing data to easily change data. This is acheived by combining an exchange which is responsive to an incoming call from another office, so as to connect to the telephone terminal corresponding to the call, with a controller which can change the data of the telephone terminal.

2. Description of the Related Art

A prior art is described in "Telecommunication" published in March 1989. According to the article, an automatic electronic jumper device is installed between office lines and extensions for managing administrative numbers to connect them. The automatic electronic jumper device manages both the office lines and extensions. The automatic electronic jumper device and office lines are previously wired to each other via an MDF. Likewise, the office line terminals and extensions are wired to each other. To connect a telephone and office line directly, the administrative numbers of both the office line and extension are entered.

In the prior art, for an incoming call from another office, its corresponding extension number is extracted for calling according to predetermined data; the data can be set and changed through a dedicated maintenance terminal. Commands are entered through the dedicated maintenance terminal to set all information on the exchange, such as the exchange configuration and the administrative numbers of the office lines and extensions. Thus, handling the dedicated maintenance terminal requires a measure of training, and the authorized person to maintain the exchange should handle the dedicated maintenance terminal to prevent a mistake in handling the terminal or the like from causing the exchange operation to stop.

On the other hand, there is demand for the exchange user to be able to easily set and change direct line data. The user cannot easily handle the conventional dedicated maintenance terminal for the reason described above. Thus, the user cannot change settings of extensions connected to direct lines as he or she desires.

SUMMARY OF THE INVENTION

Accordingly, it is an object of the invention to provide a system for connecting an incoming call to a selected extension wherein the user can easily set and change office line data.

To these ends, according to a first embodiment of the invention, there is provided a system for connecting an incoming call to a selected extension, the system comprising an exchange which connects an incoming call from another office directly to an extension, and a controller which comprises input means for accepting instructions to register assignments of extensions to specific incoming calls, definition means being responsive to the instruction accepted through the input means for defining the correspondence between the specific incoming calls and extensions, and display means for displaying the instruction to be accepted through the input means as a guide message.

The exchange includes connection means, upon receipt of an incoming call, being responsive to the correspondence defined in the definition means for connecting the incoming call to an extension corresponding thereto.

The input means accepts an entry made by the operator according to the guide message displayed on the display means in the interactive mode.

The definition means includes a direct inward dialing (DID) management table which stores the correspondence between incoming calls and extensions.

The controller includes registration means for registering the correspondence defined in the definition means in the exchange.

The exchange has a DID correspondence table in which the correspondence between the incoming line numbers of the specific incoming calls and the extension numbers is registered by the registration means for storage.

The connection means, upon receipt of an incoming call, references the DID correspondence table to connect the incoming call to an extension corresponding thereto.

The exchange further includes an acceptance section for accepting state information as to whether or not the extension is able to be connected to a specific incoming line, and report means, upon receipt of a change in the state information of the extension at the acceptance section, for signaling to the controller that the state information of the extension is changed. The controller includes control means, upon receipt of the signal indicating the state information change of the extension by said report means, for placing a restriction so as to inhibit the correspondence between the extension and its corresponding incoming line from being changed through the input means if the state information change denotes that the extension is able to be connected to the specific incoming line and removing the restriction if the state information change denotes that the extension isn't able to be connected to the specific incoming line.

The system can further include output means for outputting information indicating the corresponding incoming calls and extensions defined in the definition means. The output means includes acceptance means for accepting an output destination of the output means and may have a facsimile function for facsimile-transmitting information indicating the corresponding incoming calls and extensions defined in the definition means to the output destination accepted through the acceptance means.

The controller further includes output means for outputting information indicating the corresponding incoming calls and extensions, a room number and extension table which stores room numbers of rooms provided with the extensions and extension numbers corresponding to the room numbers, and an incoming line number table which stores predetermined incoming line numbers.

The DID management table indicates the incoming line numbers and the extension numbers as the correspondence between the incoming calls and extensions.

The input means accepts entries of the room numbers.

The output means outputs one or more incoming line numbers not set in the DID management table from among a plurality of predetermined incoming line numbers.

The input means, when more than one incoming line number is output by the output means, accepts the selection specification of one of the incoming line numbers.

The registration means references the room number and extension table and sets the selected incoming line number and an extension number corresponding to the room number in the DID management table.

The system further includes a user name table which stores user names of users who use specific extensions. The output means can output the user names corresponding to the extensions stored in the user name table and room numbers and incoming line numbers corresponding to the extensions.

The input means accepts the start time at which connection of the specified incoming call to its corresponding extension is started and the end time at which the connection is terminated.

The registration means specifies the start time and end time corresponding to the incoming call for the exchange.

The connection means includes connection control means, upon receipt of the specified incoming call from the start time to end time, for connecting the call to its corresponding extension. The exchange may include message output means for outputting a predetermined message for a predetermined time after the end time.

The input means accepts assignment of an extension to a specific incoming call, entered by the operator according to a guide message displayed on the display means in the interactive mode. The correspondence between the incoming call and extension specified by the operator is stored in the DID management table of the definition means. The registration means registers the correspondence defined in the DID management table in the exchange. The registration means may reference the DID management table to determine whether or not the instruction entered by the operator through the input means can be registered in the DID management table. Registration can be changed for each extension at any time. Further, the output means outputs the entered corresponding incoming call and extension. If the output means has a facsimile function for facsimile transmission, it outputs the entered corresponding incoming call and extension to the specified output destination via the public telecommunication network through the NCU (network control unit).

Upon receipt of registration from the registration means, the exchange rewrites the DID correspondence table, and upon receipt of the specified incoming call, references the DID correspondence table to connect the call to the corresponding extension.

If the exchange has an acceptance section such as a room indicator unit for accepting state information as to whether or not said extension is assigned to a specific incoming line, when a change in the state information of the extension is accepted at the acceptance section, the controller is signaled that the state information of the extension is changed. When receiving the signal indicating the state information change of the extension, the controller places restriction so as to inhibit the correspondence between the extension and its corresponding incoming line from being changed through the input means if the state information change denotes that the extension is assigned to the specific incoming line and removing the restriction if the state information change denotes that the extension becomes unassigned.

The room number and extension table stores room numbers and extension numbers corresponding to the room numbers. The incoming line number table stores predetermined incoming line numbers. The DID management table records the correspondence between the incoming line numbers and extension numbers.

As specific input, the input means accepts entries of the room numbers. The display means displays incoming line numbers not set in the DID management table. The input means accepts selection specification of one of the incoming line numbers. The controller references the room number and extension table and sets the selected incoming line number and an extension number corresponding to the room number in the DID management table. By obtaining user names of users who use specific extensions stored from the user name table, the output means can output the user names and room numbers and incoming line numbers corresponding to the extensions.

The input means accepts the start time at which connection of a specified incoming call to its corresponding extension is started and the end time at which the connection is terminated, and the registration means specifies the start time and end time corresponding to the incoming call for the exchange.

When receiving the specified incoming call, the exchange connects the call to its corresponding extension from the start time to end time. The exchange may include message output means for outputting a predetermined message for a predetermined time after the end time.

BRIEF DESCRIPTION OF THE DRAWINGS

In the accompanying drawings:

FIG. 4 illustrates a room number entry screen;

FIG. 5 illustrates a DID registration screen;

FIG. 6 illustrates a DID instruction and registration screen;

FIG. 7 illustrates a DID reservation screen;

FIG. 8 illustrates a DID reservation printout screen;

FIG. 9 illustrates a DID change screen;

FIG. 10 illustrates a DID reservation end time change screen;

FIG. 11 illustrates a DID room change screen;

FIG. 12 illustrates a DID reservation change screen;

FIG. 13 illustrates a DID reservation room change screen;

FIG. 14 illustrates a DID reservation time change screen;

FIG. 15 illustrates a DID reservation DI number change screen;

FIG. 16 illustrates a DID reservation DI number specification and change screen;

FIG. 17 illustrates a room status change screen;

FIG. 18 illustrates a room change screen;

FIG. 19 illustrates a direct phone number INFORM CARD image;

FIG. 20 illustrates a direct phone number RESERVE CARD image;

DESCRIPTION OF THE PREFERRED EMBODIMENTS

Figure 1:
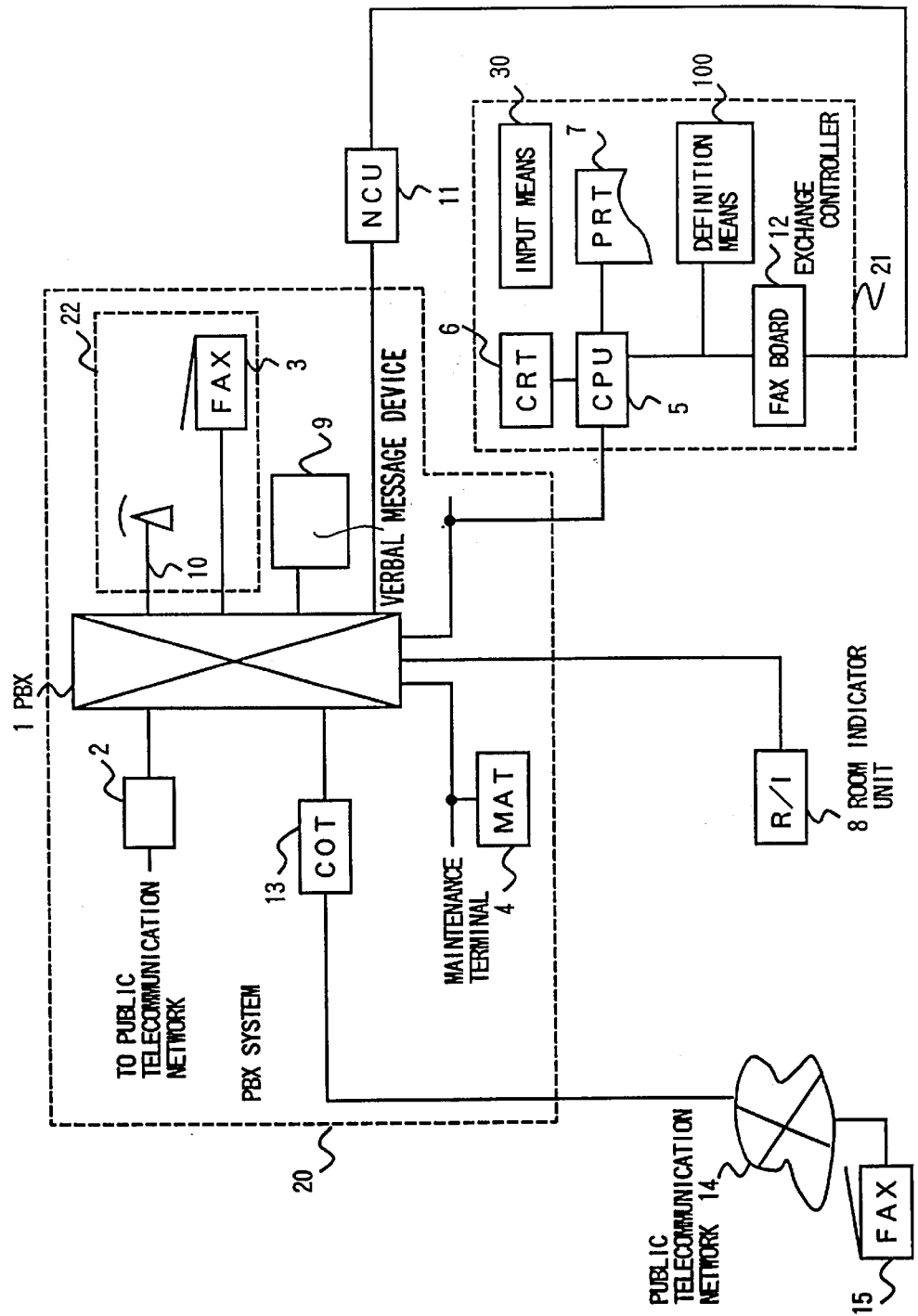
FIG. 1 is a block diagram of a system for connecting an incoming call to a selected one of a number of extensions according to a first embodiment of the invention.

Referring now to FIG. 1, there is shown a system for connecting an incoming call to a selected one of a number of extensions according to a first embodiment of the invention. In the embodiment, application of the system to a hotel system is described with an example in which a direct DID extension data change notification is transmitted from a controller to an exchange.

FIG. 1 shows a block diagram of the system for connecting an incoming call to a selected extension according to the first embodiment of the invention, wherein the system comprises a PBX (private exchange) system 20 which connects incoming calls from other offices directly to extensions and an exchange controller 21 which specifies the extensions corresponding to the incoming calls for the PBX system 20. The PBX system 20 can further include a room indicator unit 8 of an acceptance section for accepting information as to whether or not guest rooms are occupied, and can be connected via a public telecommunication network 14 to public telecommunication network terminals such as a FAX 15 and telephone.

The lines required for the PBX 1 to connect to the public telecommunication network are classified according to several incoming call types. Shown in the example are DID lines 2 used for DID and direct DID FAXs 3 in the PBX connected to the DID lines, but other extension telephones may also be connected to the DID lines. The PBX 1 has a PBX maintenance terminal 4 for setting and changing the correspondence between the DID lines 2 and direct DID FAXs 3. Since the PBX maintenance terminal 4 is located at a place where the PBX 1 is installed or in a maintenance room and both are places inconvenient to handle the maintenance terminal 4, the user cannot easily use the maintenance terminal 4. Since the maintenance terminal 4 can be operated for the entire operation of the PBX 1, handling the maintenance terminal 4 involves security operation, such as release of a guard function, and is cumbersome and difficult. Then, the embodiment provides an exchange controller 21 which enables the exchange user to change the data to set the correspondence between the DID lines 2 and direct DID FAXs 3. The exchange controller 21 and the PBX 1 can transfer data to each other according to a predetermined protocol by using an interface such as RS-232C. The exchange controller 21 has input means 30 for accepting an instruction specifying the extension corresponding to an incoming call. The input means 30 can be a keyboard of function keys, scroll keys, etc., or a mouse. An external display 6, comprising display means to easily use the exchange controller 21, is also provided for the exchange controller 21 for displaying the operation method. The input means can accept entries made by the user in response to guide messages displayed on the external display 6 in the interactive mode. Further, a printer 7, comprising output means for printing the results of the correspondence between the DID lines 2 and direct DID FAXs 3, is connected as means for storing check records. The output means comprises a FAX board 12 which can output facsimile signals via an NCU (network control unit) 11 and an office line call originating trunk 13 to a public telecommunication network terminal FAX 15 in the public telecommunication network 14. The room indicator unit 8 handles one room 22 where both direct DID FAX 3 and ordinary extension 10 are installed as one management unit for informing the PBX 1 of a state change at the same time as the room use state, such as occupation, is changed. That is, the room indicator unit 8 is used as an acceptance section for accepting state information as to whether or not each extension is able to be connected to a specific incoming line. The interface between the direct DID FAX 3 and PBX 1 is the same as that between the ordinary extension 10 and PBX 1, and an extension number is assigned to the direct DID FAX 3. A verbal message device 9 is provide as a message output means. If a call comes in as a direct FAX corresponding to the DID line 2 when the FAX is not registered, the verbal message device 9 outputs a predetermined voice guidance message for informing the originator that the called FAX is not registered. Generally, the exchange controller is handled by the user in a hotel system or the like, and signal transfer between the exchange controller and PBX is not special; although the exchange controller can also be replaced with a main frame, small business computer, or the like. The embodiment adopts a personal computer (PC) 5 as a central processing unit (CPU) of the exchange controller 21. The PC 5 comprises definition means for defining the correspondence between specific incoming calls and extensions and registration means for registering the correspondence defined in the definition means in the PBX 1. The definition means is a DID management table which stores the correspondence between incoming line numbers and extension numbers.

Figure 21:
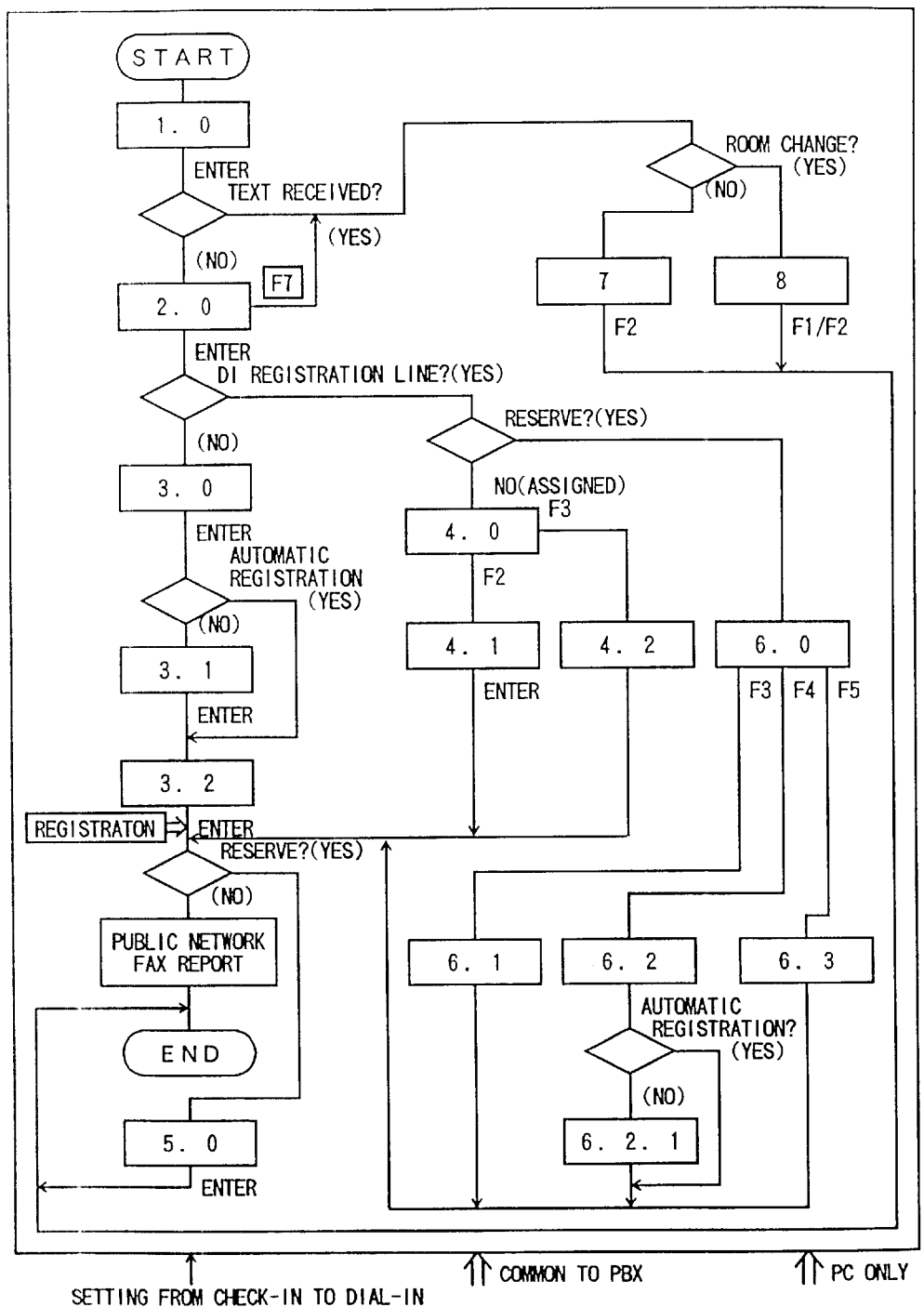
FIG. 21 is a screen transition flowchart.

A process flow is described with reference to screen examples shown in FIGS. 3–18 and a flowchart is shown in FIG. 21. The operation and signal transfer between the PBX and PC in the process flow are described with reference to FIGS. 2 and 22–25.

Figure 2:
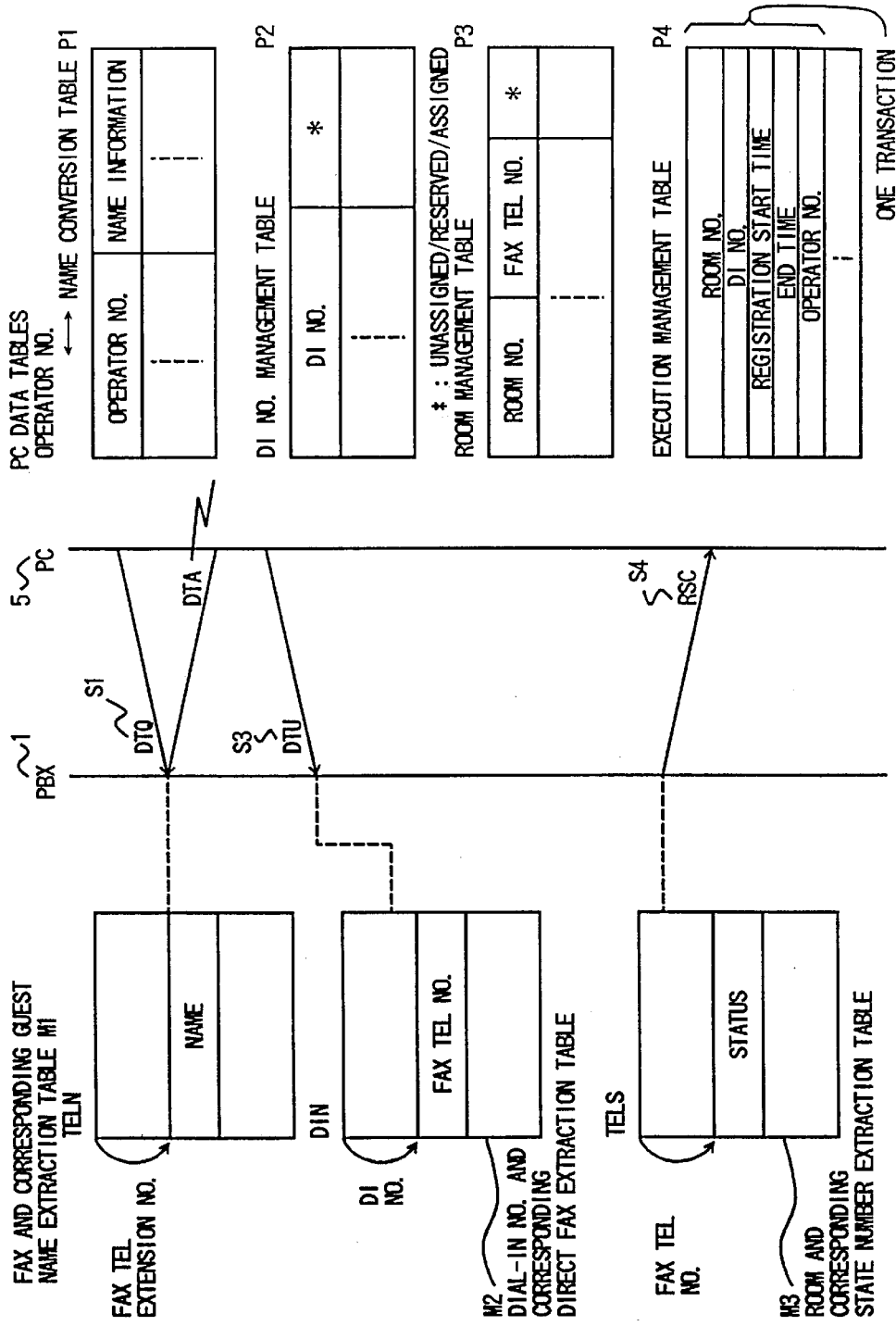
FIG. 2 is a flowchart of communication between PBX and personal computer.
Figure 22:
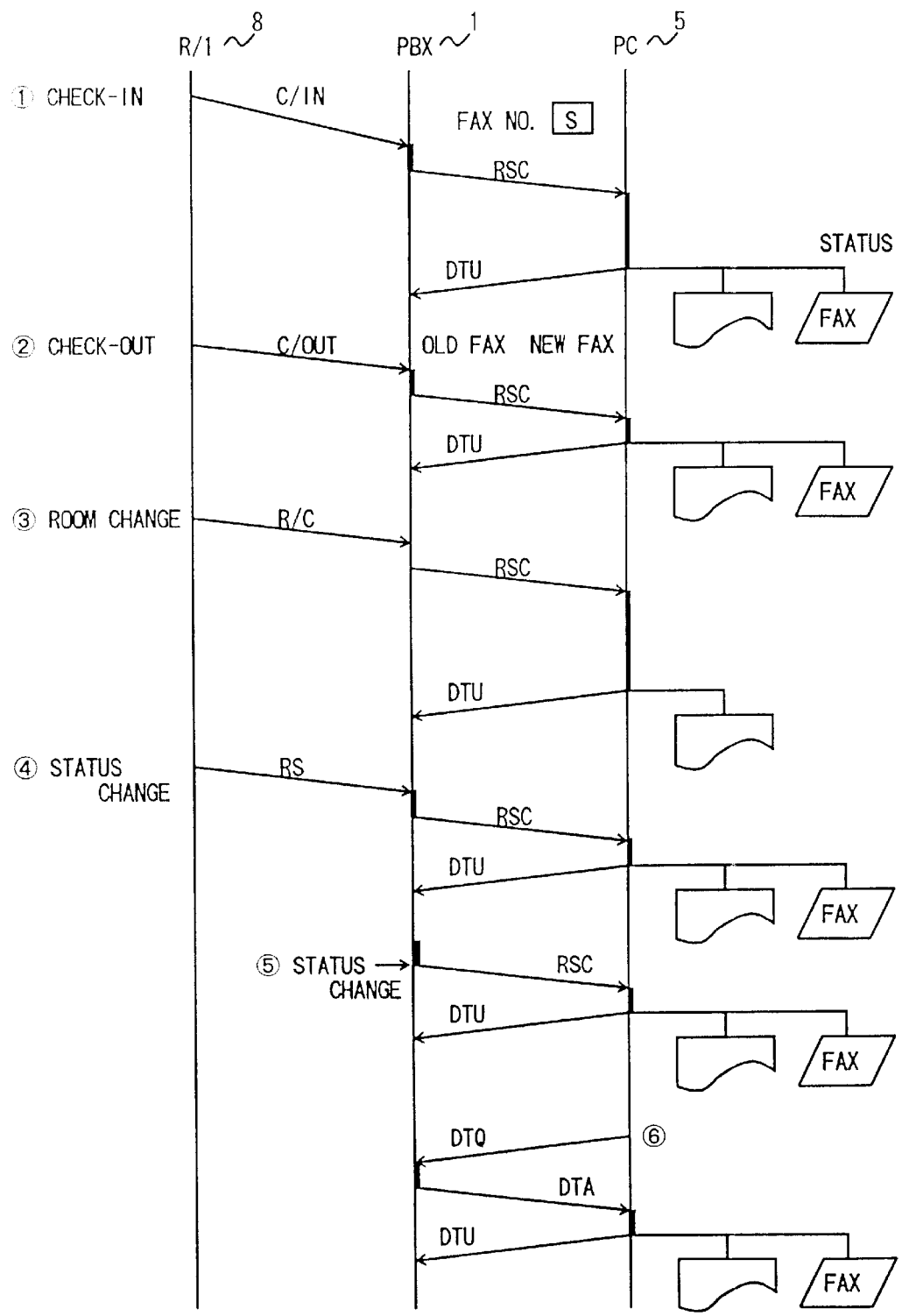
FIG. 22 is a signal transfer flowchart among, the room indicator unit, PBX, and PC.
Figures 23, 24:
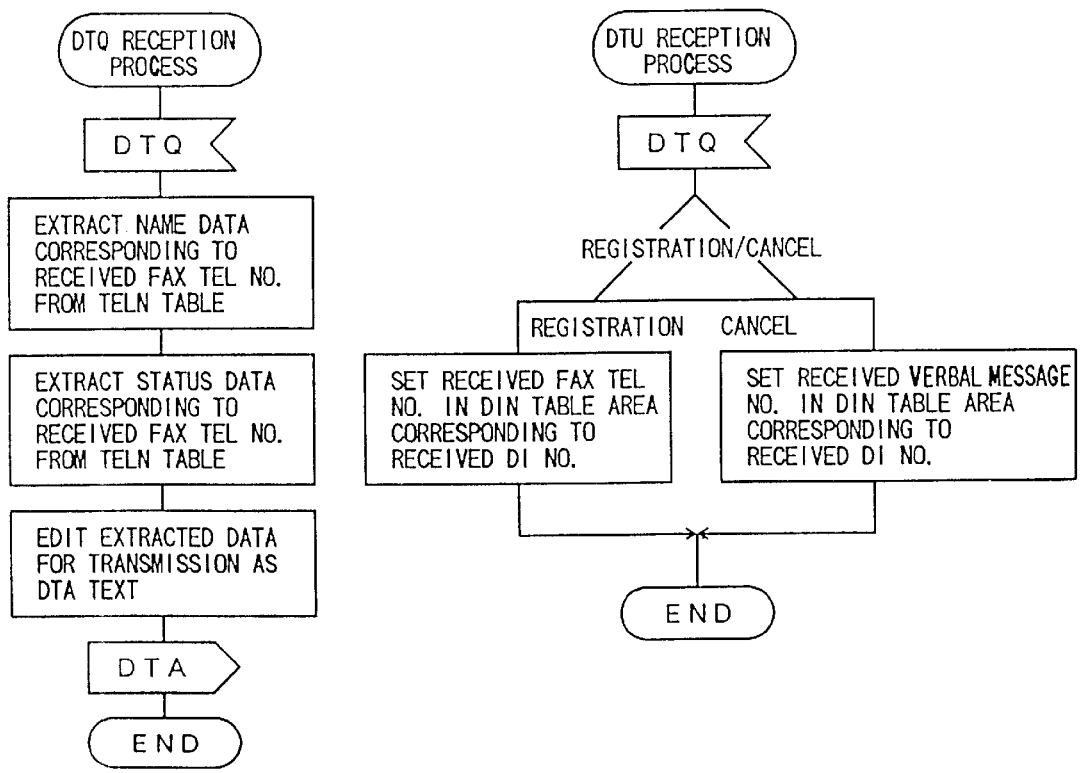
FIG. 23 illustrates the text contents transferred between PBX and PC.
FIG. 24 is a PBX process flowchart.
Figure 25:
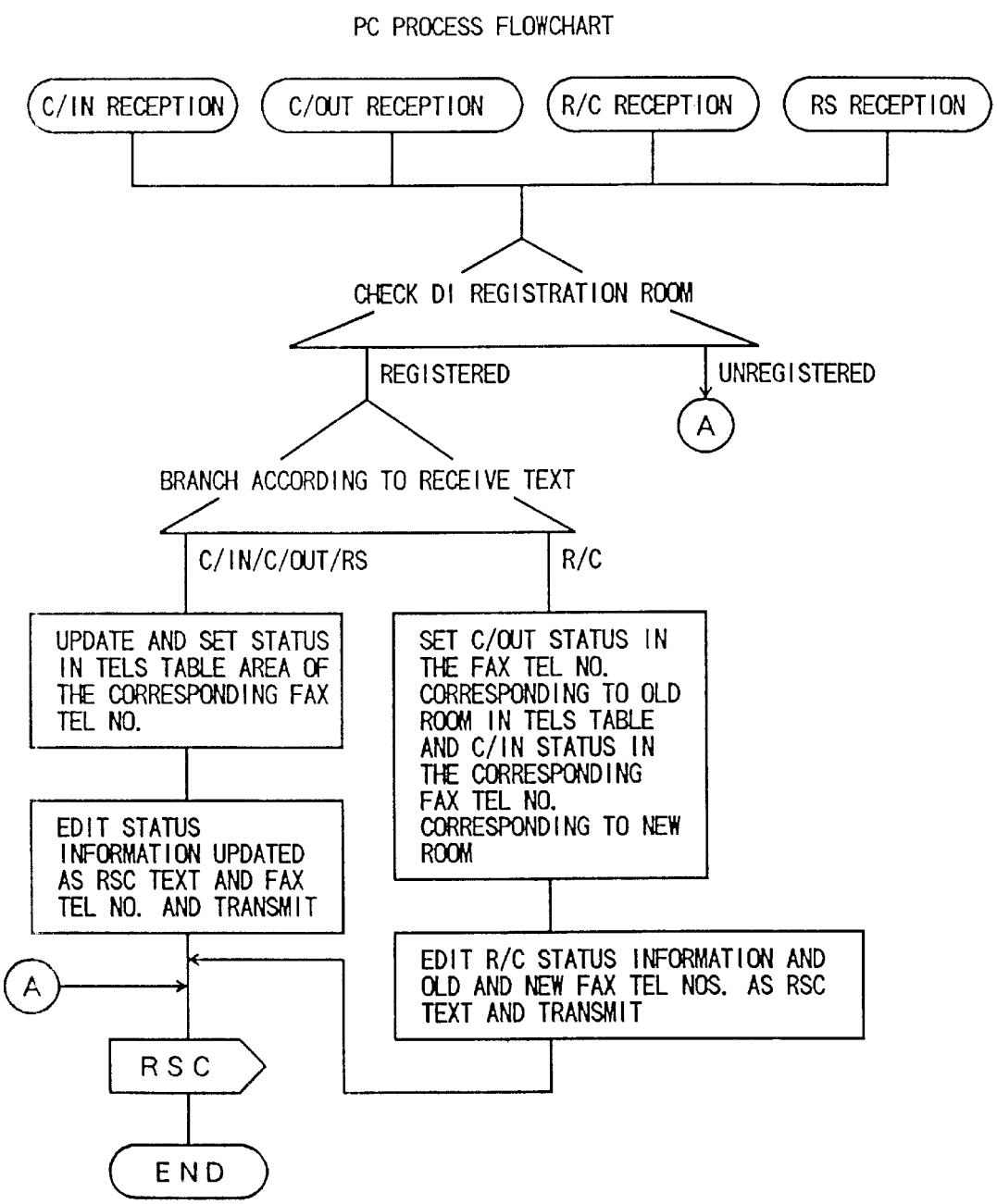
FIG. 25 is a PC process flowchart.

FIG. 21 shows a screen flowchart. FIGS. 3–18 show screen display examples. The numbers in boxes shown in FIG. 21 denote the numbers displayed in the upper right corners of the example screens in FIGS. 3–18. Some example screens are relevant to DID setting and registration and others are relevant to reregistration in response to a state change from the PBX. FIG. 2 shows transfer of signals or texts between the PBX and PC to change data tables which store FAX extensions called from the PC 5 when calls come into the PBX 1 on DID lines. The tables contained in the PBX 1 are shown on the left of FIG. 2 and the tables in the PC 5 on the right of FIG. 2. The PBX 1 tables are a FAX and corresponding guest name extraction table M1 which stores guest names corresponding to FAX numbers (names of users who use specific extensions); a DID number and corresponding direct FAX extraction table M2 which stores DID numbers of incoming line numbers and FAX numbers of extension numbers corresponding thereto; and a room and corresponding state number extraction table M3 which indicates whether or not each room is occupied. The PC 5 tables are an operator number-operator name conversion table P1 which stores operator numbers and operator names to previously register persons who operate the PC 5; a DID number management table P2 which indicates the assignment state of each dial number, namely, unassigned, reserved, or assigned; a room management table P3 which indicates the correspondence between room numbers and FAX numbers and the assignment state of each FAX number, namely, unassigned, reserved, or assigned; and an execution management table P4 which temporarily stores room number, DID number, registration start time, registration end time, and operator number during processing. FIG. 22 shows signal transfer between the PBX and PC when a state change occurs at the room indicator unit 8. FIG. 23 shows the text contents transferred between the PBX and PC. FIG. 24 shows a PBX process flow. FIG. 25 shows a PC process flow.

Figure 3:
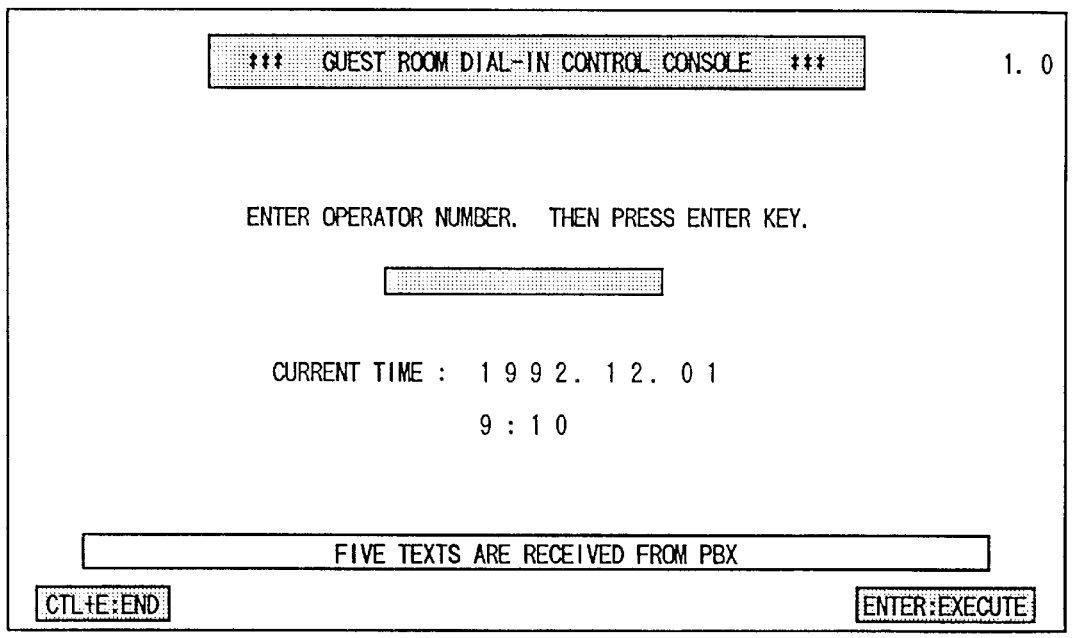
FIG. 3 illustrates an operator number entry screen.

First, when the PC 5 is started, the operator number entry screen (screen No.1.0) shown in FIG. 3 is displayed as the initial screen of application service. The screen shown in FIG. 3 requests the operator to enter the operator number for starting the application service. The screen also has a function of displaying operator notification messages together with the number of the messages if the operator's decision is required when an RSC (S4) text is received from the PBX 1, such as the message "Five texts are received from PBX" shown at the bottom of FIG. 3. For example, when a room change occurs, the operator is requested to judge whether or not the FAX number in a new room is to be again registered. Judgment criteria on which messages are to be displayed are previously registered as data, and messages are displayed according to the judgment criteria. Thus, if a text is received from the PBX 1, when the operator presses the ENTER key, the screen moves to an RSC (S4) text processing screen (described below) in preference.

When the input means 30 accepts the operator number, the PC 5 determines whether or not a text is received from the PBX 1. If no texts are received, the PC 5 accepts the ENTER key through the input means 30 and moves the screen shown in FIG. 3 to the screen shown in FIG. 4. The PC 5 references the operator number-name conversion table shown in FIG. 2 and extracts the operator name corresponding to the operator number. Information can be preset in the operator number-name conversion table shown in FIG. 2 through the input means.

FIG. 4 is a room number entry screen (screen No.2.0) which displays the registered operator name corresponding to the entered operator number for confirmation of the operator number. Texts received from the PBX 1 are also displayed on the screen shown in FIG. 4; the screen can also be moved to a receive text processing screen if the operator presses the F7key of the input means 30. The input means 30 accepts the room number of the DID line user entered by the operator. When accepting the ENTER key through the input means 30, the PC 5 references the room management table P3 to get the FAX number corresponding to the entered room number, and checks to see if the FAX number is registered for DID by referencing the column Unassigned/reserved/assigned of the room management table P3 . If the FAX number is unassigned, the PC 5 judges it to be unregistered for DID. If the FAX number is reserved or assigned, the PC 5 judges it to be already registered for DID. Also, the PC 5 asks the PBX 1 about the guest name corresponding to the room number. To do this, the PC 5 sends a DTQ (S1) text to the PBX 1, as shown in FIG. 2. The DTQ (S1) text, which denotes a data request text, is a signal transmitted by the PC 5 to the PBX 1 for requesting the PBX 1 to return data of the user name of the direct DID FAX 3 and the FAX installation room state. The number of the DID direct FAX 3 is added to the signal for transmission. When receiving the DTQ (S1) text, the PBX 1 operates as shown in FIG. 2. First, the PBX 1 retrieves the user name information corresponding to the received FAX telephone number from the FAX and corresponding guest name extraction table M1 shown in FIG. 2, and also retrieves the room state indicating whether or not the room is occupied from the room corresponding state number extraction table M3. The PBX 1 returns the retrieved data to the PC 5 as a DTA (S2) text which denotes a data answer text containing the DID direct FAX number, user name information, and room state. If the necessary information is not registered in the FAX and corresponding guest name extraction table M1, the PBX 1 returns a message to the effect that it is not registered. In the FAX and corresponding guest name extraction table M1, guest names can be entered from a connection device (not shown) of another hotel system connected to the exchange, and may also be registered from the PC 5. State information as to whether or not each room is occupied is accepted from the room indicator unit 8, and state information corresponding to the previously registered room number is registered on demand in the room and corresponding state number extraction table M3.

Next, if the FAX corresponding to the entered room number is not registered for DID, the screen moves to another screen (screen No.3.0) shown in FIG. 5. The screen in FIG. 5 is a DID registration screen which displays the guest name and room number corresponding to the FAX telephone number returned with the DTA (S2) text. The screen displays a message for requesting the operator to specify the registration method of automatic registration where the PC 5 automatically selects a DID line or arbitrary registration where the operator, specifies a DID line. If the operator selects arbitrary registration with scroll keys of the input means 30 and presses the ENTER key, the PC 5 displays a DID specification and registration screen (screen No.3.1) shown in FIG. 6. If the operator selects automatic registration with scroll keys of the input means 30 and presses the ENTER key, the PC 5 automatically selects one of unassigned DID numbers. In the automatic registration, the numbers may be assigned in the order in the DID management table or the line whose idle time is longest or the line whose average busy time is shortest may be selected among unassigned DID lines according to a predetermined assignment condition for automatic registration. This condition should be prespecified in the PC 5.

For arbitrary registration, unassigned DID numbers are listed together with the pilot number for easy confirmation on the screen as shown in FIG. 6. When the operator selects one of the unassigned DID numbers with the scroll keys of the input means 30 and presses the ENTER key, the PC 5 selects the operator-selected DID number.

When the DID number is selected, then the PC 5 displays a DID reservation screen (screen No.3.2) shown in FIG. 7. The screen in FIG. 7 displays a message for requesting the operator to select immediate registration or reservation for dial-in service. The input means 30 accepts the message destination FAX number entered by the operator. The message destination FAX number is a FAX number at the location to which the DID direct number used by the guest is to be reported. If the output means contains a facsimile board, the corresponding room number, incoming line number (phone number), and user name can be output to the previously specified message destination FAX number. Although only one message destination FAX number is entered on the screen shown in FIG. 7, more than one number can be entered by providing another screen.

If the operator presses the ENTER key without entering the time through the input means 30, the PC 5 assumes immediate registration to be specified; if the operator enters the time and presses the ENTER key, the PC 5 assumes reservation to be specified. At the time, if the operator does not enter the end time, the registration continues until cancel is again accepted at the terminal; if the operator enters the end time, the PC 5 terminates the DID when the end time is reached.

If immediate registration is specified or when the reserve start time is reached, the registration means of the PC 5 sends a DID connection change text of DTU (S3) shown in FIG. 2 to the PBX 1 for DID registration. The DTU (S3) contains a registration/cancel flag which is set to registration, the automatically selected or operator-selected DID line 2 number, and its corresponding DID direct FAX 3 number. When receiving the DTU (S3) text, the PBX 1 operates as shown in FIG. 24. First, the PBX 1 writes data into the DID number and corresponding direct FAX extraction table M2 for registration. The DTU (S3) text can be used for registration and cancellation of DID. For registration, the extension FAX number is written into the DID number and corresponding FAX extraction table M2 for the DID line 2; for cancellation, the verbal message number is written into the DID number corresponding FAX extraction table M2 for the DID line 2. The verbal message number takes a trunk number. The trunk is connected to the tape recorder in which the predetermined voice message is recorded. If the DID direct FAX number is registered in the DID number and corresponding FAX extraction table M2, when a call comes in on the setup DID line 2 from another office, it is connected to the DID direct FAX 3. If the verbal message number is registered for canceling the DID, when a call comes in on the setup DID line 2 from another office, the message recorded in the verbal message device 9 is output for the predetermined time.

Upon completion of the immediate registration, then the PC 5 outputs the registration results at the printer 7 for confirmation of the registration. As an output example, a card of postal card size as shown in FIG. 19 may be printed out for service for hotel guests, etc. The card shown in FIG. 19 can also be printed out when card output is specified through the input means 30. Further, if a DTU (S1) text is transferred between the PBX 1 and PC 5 and the contents of the DID number and corresponding direct FAX extraction table M2 are changed, the card can be unconditionally printed out for output of the most recent information. As card output, in response to the message destination FAX number entered on the screen in FIG. 7, the FAX board 12 can call the PBX 1 via the NCU 11 for connection through the office line call originating trunk 13 to the public telecommunication network terminal FAX 15 in the public telecommunication network 14 to transmit the guest name, registered, changed, or canceled title, DID direct number, and hotel name. If reservation is registered, the PC 5 displays a DID reservation printout screen (screen No.5.0) shown in FIG. 8, requesting the operator to specify whether or not printout is to be executed. If the operator selects printout through the input means 30, the registration results are output at the printer 7 as a card of postal card size containing the reservation time shown in FIG. 20. At reservation, the FAX number of the reserve guest can also be entered in the message destination FAX number for transmitting the reservation result to the FAX of the reserving guest.

The PC 5 now completes the registration of the DID. The DID number management table P2 and the room management table P3 may be combined into a DID management table which stores the correspondence between incoming calls and extensions as definition means.

In FIG. 4, when the input means 30 accepts the room number entered by the operator, the PC 5 references the room management table P3. If the FAX corresponding to the room is already registered for DID, the PC 5 assumes a change step to be specified. If "assigned" is set in the room management table P3 for the FAX of the room, a screen shown in FIG. 9 is displayed. If "reserved" is set, a screen shown in FIG. 12 is displayed. The screen in FIG. 9 is a DID change screen (screen No.4.0) which is used to change the setup DID end time, the room number, etc. In this case, the operator should use the function keys of the input means 30 to select the information to be changed. The PC 5 displays another screen in response to the function key pressed by the operator.

When "assigned" is set, if the operator presses the F2key of the input means 30 to change the end time, the screen moves to a DID reservation end time change screen (screen No.4.1) shown in FIG. 10 used to change the reservation end time or cancel the reservation. When the operator enters the reservation end time through the input means 30 and presses the ENTER key, the PC 5 handles the change. To cancel the reservation, the PC 5 transmits a DTU (S3) text shown in FIG. 2 for a verbal message device connection request to the PBX 1. The PBX 1 sets the verbal message number in the FAX number area of the DID number and corresponding direct FAX extraction table M2 corresponding to the DID number for connection to the verbal message device 9 when a call comes in on the DID line 2.

When "assigned" is set, if the operator presses the F3key of the input means 30 to change the room number, the screen moves to a DID room change screen (screen No.4.2) shown in FIG. 11 which is used to change the room number. If a room change is made, it may be desired to continue to use the same telephone number for the DID line 2. To do this, the direct DID FAX 3 number should be changed. When the operator enters the room number through the input means 30 and presses the ENTER key, the PC 5 handles the change. The PC 5 transmits a DTU (S3) text containing the DID number and the FAX number of the FAX installed in a new room to the PBX 1. The PBX 1 sets the FAX number corresponding to the DID number in the DID number and corresponding direct FAX extraction table M2 for registration, thereby changing the incoming FAX extension by executing a single step with the DID line number intact.

Next, in FIG. 4, if "reserved" is set, the screen moves to a DID reservation change screen (screen No.6.0) shown in FIG. 12 which is used to change the DID end time, room number, etc.

On the screen, the operator should use the function keys of the input means 30 to select fields for new entries of the room number, DID number, reservation time, etc. The PC 5 displays another screen in response to the function key pressed by the operator.

When "reserved" is set, if the operator presses the F3key of the input means 30 to change the room number, the screen moves to a DID reservation room change screen (screen No.6.1) shown in FIG. 13 which is used to change the reserved room number. When the operator enters the room number through the input means 30 and presses the ENTER key, the PC 5 handles the change. In the room management table P3, the PC 5 registers data of "unassigned" for the FAX installed in the old room and data of "reserved" for the FAX installed in the new room. Since this process is limited to the PC 5 operation, no information is sent to the PBX 1.

When "reserved" is set, if the operator presses the F4key of the input means 30 to change the DID number, the screen moves to a DID reservation dial-number change screen (screen No.6.2) shown in FIG. 15 used to change the DID number. On the screen, a message is displayed requesting the operator to specify automatic or arbitrary selection. When the operator specifies arbitrary selection with the scroll keys of the input means 30, the PC 5 displays a DID reservation DI number specification change screen (screen No.6.2.1) shown in FIG. 16, wherein unassigned DID numbers are listed together with the pilot number for easy check or confirmation. If the operator selects one of the unassigned DID numbers with the scroll keys of the input means 30, the PC 5 registers the DID number selected by the operator.

If the operator specifies automatic selection with the scroll keys of the input means 30 and presses the ENTER key, the PC 5 automatically selects one of the unassigned DID numbers according to the condition previously specified in the PC 5 as described above. Since this process is limited to the PC 5 operation, no information is sent to the PBX 1.

When "reserved" is set, if the operator presses the F5key of the input means 30 to change the end time on the screen in FIG. 12, the screen moves to a DID reservation time change screen (screen No.6.3) shown in FIG. 14 used to change the reservation start or end time. The start time and the end time are registered in their respective time tables for separate management and the old data is deleted. Since this process is limited to the PC 5 operation, no information is sent to the PBX 1.

The PC 5 now completes the registration change process.

Described below is the system operation when a state change occurs at the room indicator unit 8.

When a state change occurs at the room indicator unit 8, the PBX 1 transmits an RSC (S4) text. FIG. 22 shows a transfer sequence of texts among the room indicator unit 8, PBX 1, and PC 5. FIG. 25 shows a process flow of the PBX 1. In response to the text contents, the PC 5 makes the screen transition from FIG. 3 or 4 to 17 or 18. The RSC (S4) text contains a FAX number and status information indicating the occupation state of the room corresponding to the FAX number. When a room change is made, new and old FAX numbers are added. The status information contains room check-in/check-out, room change, forcible status information change, etc. The RSC (S4) text denotes a direct extension state change notification text. At state change service special number entry of one room 22 on an extension or upon receipt of text from the room indicator unit 8, the PBX 1 changes the state number corresponding to the extension number in the room and corresponding state number extraction table M3 and transmits to the PC 5. The DTQ (S1), DTA (S2), DTU (S3), and RSC (S4) texts are used in combination.

FIG. 17 shows a room status change screen screen No.7.0). When a state change occurs at the room indicator unit 8, as shown in FIG. 25, the PBX 1 determines whether or not DID is registered, and if registered, updates the status information from the corresponding FAX number in the TELS table M3 shown in FIG. 2. Next, the PBX 1 transmits an RSC (S4) text to the PC 5. When receiving the RSC (S4) text, the PC 5 returns, to the PBX 1, a DTQ (S1) text to which the corresponding FAX number is added. When receiving a DTA (S2) text from the PBX 1, the PC 5 also displays the guest name for the room as shown on the screen in FIG. 17. This screen is displayed in order to request the operator to specify whether or not registration is to be continued for the FAX number registered for DID when the room state is changed. If the operator presses the F2key of the input means 30, the PC 5 transmits a DTU (S3) text to the PBX 1 to cancel DID, or without operator's entry, presetting may also be made in the PC 5 for automatic transmission of the DTU (S3) text.

FIG. 18 shows a room status change screen. When a room change is made, the previously assigned FAX number is called the old FAX number and a newly assigned FAX number is called a new FAX number. When receiving the room change status, the PBX 1 determines whether or not DID is registered, and if registered, sets the check-out status in the FAX number corresponding to the old room in the TELS table M3 shown in FIG. 2 and the check-in status in the FAX number corresponding to the new room. Next, the PBX 1 transmits, to the PC 5, an RSC (S4) text to which the new and old FAX numbers and status information are added. When receiving the RSC (S4) text, the PC 5 returns, to the PBX 1, a DTQ (S1) text to which the new FAX number is added. When receiving a DTA (S2) text from the PBX 1, the PC 5 also displays the guest name for the room as shown on the screen in FIG. 18. This screen is displayed for room change processing, requesting the operator to specify whether or not the DID line number is to be changed. If the operator presses the F1key of the input means 30, the PC 5 executes reregistration by changing the direct DID FAX number 3 assigned to the DID line 2 to the FAX number corresponding to the new room. That is, the PC 5 transmits a DTU (S3) text containing the DID number with the new FAX number to the PBX 1. When receiving the text, the PBX 1 changes the FAX telephone number in the DID number corresponding and direct FAX extraction table M2 to the new FAX number. If the operator presses the F2key of the input means 30, the PC 5 cancels direct DID line service by transmitting a DTU (S3) text containing the DID number and verbal message number to the PBX 1. When receiving the text, the PBX 1 changes the DID number and corresponding direct FAX extraction table M2 for canceling the direct DID line service. When a preset room number is changed, the FAX installed in the room is automatically assumed to be a direct DID line for cancel, and a DTU (S3) text for registration can also be transmitted.

Next, referring to FIG. 22 which shows a signal flowchart among the room indicator unit 8, PBX 1, and PC 5, a signal sequence example of RSC (S4), DTQ (S1), DTA (S2), and DTU (S3) is given in which the PC 5 automatically relates the DID lines 2 to the direct DID FAXs 3. In the example, DID is registered in response to a change in the room indicator unit 8.

When the operator performs check-in operation at the room indicator unit 8, the C/in signal is transmitted to the PBX 1. When receiving the signal, the PBX 1 transmits, to the PC 5, an RSC (S4) text indicating room check-in with the FAX number installed in the check-in room. When receiving the text, the PC 5 automatically selects one of the unassigned DID numbers in response to the indicated FAX number, and returns a DTU (S3) text indicating the FAX number and the automatically selected DID number to the PBX 1. When receiving the text, the PBX 1 sets the FAX number in the DID number and corresponding direct FAX extraction table M2. After transmitting the DTU (S3) text, the PC 5 prints out registration, transmits to the entered public telecommunication network terminal FAX 15 number, and reports the registered DID number, guest name, etc. When the operator performs check-out operation at the room indicator unit 8, the C/out signal is transmitted to the PBX 1.

When receiving the signal, the PBX 1 transmits, to the PC 5, an RSC (S4) text indicating room check-out with the FAX number installed in the check-out room. When receiving the text, the PC 5 registers as "unassigned" the DID number to which the received FAX number is assigned, and returns a DTU (S3) text indicating the verbal message number and the unassigned DID number to the PBX 1. When receiving the text, the PBX 1 sets the verbal message number in the DID number and corresponding direct FAX extraction table M2. After transmitting the DTU (S3) text, the PC 5 prints out cancel, transmits to the entered public telecommunication network terminal FAX 15 number, and reports unassignment of the DID number together with the guest name.

When the operator performs a room change operation at the room indicator unit 8, the room change signal is transmitted to the PBX 1. When receiving the signal, the PBX 1 transmits, to the PC 5, an RSC (S4) text indicating the FAX number installed in the old room and that in the new room. When receiving the text, the PC 5 returns to the PBX 1 a DTU (S3) text indicating the DID number and new FAX number for assignment of the new FAX number to the DID number to which the received FAX number is assigned. When receiving the text, the PBX 1 sets the new FAX number in the DID number and corresponding direct FAX extraction table M2. After transmitting the DTU (S3) text, the PC 5 prints out the change.

When the operator performs a status change operation at the room indicator unit 8, the room status change signal is transmitted to the PBX 1. When a status change is forced to be made in the PBX 1, the PBX 1 transmits, to the PC5, an RSC (S4) text indicating the room status change together with the FAX number installed in the room 22 whose status is changed. Judgment criteria are preset in the PC 5, and according to the received status, the PC 5 may ignore the status change or perform the same cancel processing as check-out described above.

Automatic registration is discussed above. The signal sequence of registration and cancellation by the operation of the PC 5 can also be registered each time from the PC 5, as described above. The PC 5 transmits a DTQ (S1) text to the PBX 1. The PBX 1 checks the received FAX number and returns to the PC 5 a DTA (S1) text indicating the guest name and status information. After confirmation on the screen, for registration, the PC 5 transmits a DTU (S3) text indicating the DID number and FAX number; for cancel, the DID number and verbal message number. When receiving the text, the PBX 1 sets the FAX number or verbal message number in the DID number and corresponding direct FAX extraction table M2 area corresponding to the DID number. After transmitting the DTU (S3) text, the PC 5 prints out cancel, transmits to the entered public telecommunication network terminal FAX 15 number, and reports unassignment of the DID number together with the guest name.

The operator operation interface application provided by the PC 5 enables general staff to change PBX data or direct extensions to DID lines, thereby widening and improving line use service. Although registration and cancellation by the PC 5 operation are described in the example, the PC 5 can also perform processing automatically when receiving RSC (S4) texts for check-in, check-out, and status change.

Also, in general enterprises, corporations, and hospitals, connection of extension numbers corresponding to direct lines can be easily changed to different extensions or to a verbal message, voice mail system, etc., only in the noon recess. A radio telephone terminal for business is assigned to a guest, and a direct line number is reported to a facsimile of the destination designated by the guest, thereby providing an incoming call service directly for the guest. Although the embodiment takes DID as an example, similar features can also be provided on other types of direct lines. Further, the PC 5 may manage charging when calls originate from extensions for each room. The telephone numbers of the indicated destinations may be registered for abbreviated calling. The conventional automatic electronic jumper device has a disadvantage of a limitation in planning numbers because of the relationship between jumper administrative numbers and extension numbers. Since incoming calls are connected via the administrative numbers and extension numbers, the extension numbers are limited. The system according to the embodiment connects incoming calls directly to the extensions, whereby the telephone numbers can be planned without limiting the extension numbers.

The system according to the invention enables the user to select extension numbers as desired for effective use of direct lines and increased usage per line.

The external controller connected to the exchange enables the user to select extension numbers to be directly called in response to incoming calls from other offices by entering instructions according to guide messages in the interactive mode; any person who has not undergone exchange operation training or education can still change the extension numbers easily. Further, the external controller connected to the exchange enables the user to inquire what extension number is to be directly called in response to an incoming call from another office and to respond to the answered extension number for calling it, whereby the relationships between the direct lines and extensions can be changed more speedily without increasing the storage capacity of the exchange.

Since a change can be detected speedily by reporting the state of an extension called directly, the correspondence between the lines and extensions can be maintained in real time. Further, the controller provides the interactive mode which enables the operator to lessen entry errors and change data immediately, thereby eliminating erroneous extension connection and lack of response which will otherwise be made or occur.

Further, the system can support all direct extension call services and free the user from restrictions for improvement of services.

The texts transferred between the exchange and controller are defined to eliminate the need for considering the mode of the external controller connected to the exchange for raising flexibility of the system design. Since the controller can contain a timer function for registering and terminating the relationship between direct lines and extensions at any desired time, the operator can be freed from time restrictions, and service improvement can also be intended for extensions.

Further, after a direct DID FAX number is given to a guest or when it becomes unassigned, the user who uses the direct DID number as the originating dial number should be informed. The system according to the embodiment can automatically transmit the direct DID number to the FAX of the person who should be informed instead of the guest or person given the DID direct number for service improvement for direct line users.

The PC 5 can also serve as a terminal of a general purpose computer which can transfer signals to and from the exchange or in a local area network via which signals can be transferred to and from the exchange.

According to the invention, a system for connecting an incoming call to a selected one of a number of destinations can be constructed wherein the user can easily set and change direct line data.

What is claimed is:

1. A system for interactively registering a user being provided a service of a telephone exchange to directly connect a dialed in telephone call identified by a specific dialed-in number to a specific telephone terminal from among a plurality of telephone terminals, said system comprising:

an output device which outputs quidance information about inputting a request to use the specific telephone terminal and a room user identification indication corresponding to the specific telephone terminal;

an acceptance device which accepts the inputted request and the room user identification indication; and an assignment processor which responds to acceptance of request by said acceptance device by temporarily assigning one of a plurality of specific dialed-in numbers to the specific telephone terminal in accordance with the accepted room user identification indication;

wherein:

the plurality of telephone terminals are not associated with dialed-in numbers until said assignment processor temporarily assigns a dialed-in number to a telephone terminal;

said acceptance device is adapted to accept a cancellation time for the temporary assignment; and said assignment processor further responds to acceptance of the cancellation time by said acceptance device by cancelling the assignment at the accepted cancellation time.

2. A system for connecting an incoming telephone call to a selected telephone extension, said system comprising:

a plurality of telephone terminals, each terminal identified by an associated extension number;

a controller which accepts a request to use a first one of said terminals, as identified by the associated extension number, and temporarily assigns one of a plurality of dialed-in numbers to said first one of said terminals;

a memory which stores the correspondence between dialed-in numbers and extension numbers of said plurality of terminals as assigned by said controller;

an exchange unit which directly connects a call identified by the assigned dialed-in number to said first one of said terminals, as identified by the associated extension number as stored in said memory; and an acceptance device which receives a cancellation time for said first one of said terminals;

wherein:

said terminals are not associated with a dialed-in number until said controller temporarily assigns a dialed-in number to a terminal; and said controller responds to said acceptance device receiving a cancellation time by cancelling the assignment of said one of the dialed-in numbers to said first one of said terminals.

3. A system for interactively registering a user being provided a service of a telephone exchange to directly connect a dialed in telephone call identified by a specific dialed-in number to a specific telephone terminal from among a plurality of telephone terminals, said systems comprising:

an output device which outputs guidance information about inputting a request to use the specific telephone terminal and a room user identification indication corresponding to the specific telephone terminal;

an acceptance device which accepts the inputted request, the room user identification indication, and a cancellation time; and an assignment processor which responds to acceptance of the request, the identification indication, and the cancellation time by said acceptance device by temporarily assigning one of a plurality of specific dialed-in numbers to the specific telephone terminal in accordance with the accepted room user identification indication and, at the accepted cancellation time, cancelling the temporary assignment;

wherein:

the plurality of telephone terminals are not associated with the dialed-in numbers until said assignment processor temporarily assigns a dialed-in number to a telephone terminal; and after cancellation of the temporary assignment, said assignment processor does not assign the one of the plurality of specific dialed-in-numbers to another specific telephone terminals for at least a preselected time.

* * * * *